United States Patent
Hauser et al.

(10) Patent No.: US 7,615,253 B2
(45) Date of Patent: Nov. 10, 2009

(54) MARKING HEAT-TREATED SUBSTRATES

(75) Inventors: Hubert Hauser, Wurselen (DE); Herbert Stadelmann, Aachen (DE); Andreas Kasper, Vaals (NL)

(73) Assignee: Saint-Gobain Glass France, Courbevoie (FR)

( * ) Notice: Subject to any disclaimer, the term of this patent is extended or adjusted under 35 U.S.C. 154(b) by 139 days.

(21) Appl. No.: 10/518,534

(22) PCT Filed: Jun. 25, 2003

(86) PCT No.: PCT/FR03/01953

§ 371 (c)(1), (2), (4) Date: Sep. 13, 2005

(87) PCT Pub. No.: WO2004/007388

PCT Pub. Date: Jan. 22, 2004

(65) Prior Publication Data

US 2006/0099423 A1 May 11, 2006

(30) Foreign Application Priority Data

Jul. 3, 2002 (DE) ................ 102 29 833

(51) Int. Cl.
*B05D 5/04* (2006.01)
*B05D 1/32* (2006.01)

(52) U.S. Cl. ............... 427/287; 427/271; 427/282

(58) Field of Classification Search ............ None
See application file for complete search history.

(56) References Cited

U.S. PATENT DOCUMENTS

| | | | |
|---|---|---|---|
| 4,503,437 A | 3/1985 | Katzschner | |
| 4,661,305 A * | 4/1987 | Carlomagno | 264/132 |
| 5,565,237 A | 10/1996 | Bartetzko | |
| 5,684,515 A * | 11/1997 | Ho | 347/2 |
| 6,037,041 A * | 3/2000 | Van Kooyk et al. | 428/195.1 |
| 6,430,964 B1 * | 8/2002 | Dauba et al. | 65/29.19 |
| 6,555,794 B2 | 4/2003 | Leutner et al. | |
| 6,638,440 B1 | 10/2003 | Grimard | |

FOREIGN PATENT DOCUMENTS

| | | |
|---|---|---|
| DE | 964 095 | 5/1957 |
| DE | 33 32 029 | 3/1984 |
| DE | 41 11 625 | 9/1991 |
| DE | 195 16 863 | 7/1996 |
| DE | 200 20 984 | 6/2001 |
| EP | 0 433 137 | 6/1991 |
| FR | 2 787 061 | 6/2000 |
| WO | 00/02825 | * 1/2000 |
| WO | 01/94128 | 12/2001 |

* cited by examiner

Primary Examiner—Frederick J Parker
(74) Attorney, Agent, or Firm—Oblon, Spivak, McClelland, Maier & Neustadt, L.L.P.

(57) ABSTRACT

A method for visual marking of heat-treated substrates, in particular tempered glass panes. The method modifies a marking layer deposited on a surface of the substrate, that visually indicates that the heat treatment has been carried out, and produces a rough marking field on the surface of the substrate that the marking layer deposited on the substrate exhibits intimate adhesive bonding thereto, which marking layer cannot be completely removed using a mechanical mechanism.

19 Claims, 1 Drawing Sheet

MARKING HEAT-TREATED SUBSTRATES

CROSS-REFERENCE TO RELATED APPLICATIONS

The present application is the U.S. counterpart of WO 2004/007388, and in turn claims priority to German application number 102 29 833.5 filed on Jul. 3, 2002, the entire contents of each of which are hereby incorporated herein by reference.

FIELD OF THE INVENTION

The invention relates to a method for making heat-treated substrates, in particular tempered glass panes.

DISCUSSION OF THE BACKGROUND

The initial characteristics stem from WO-A1-00/02825, which describes a method for marking glass panes after a heat treatment. According to a preferred application case mentioned in this description, tempered glass panes, that have undergone an aging test following the tempering operation, are provided with a local colored marking. This marking is produced by means of a special thermochromic organic color, that is applied locally, for example by screen printing, after the tempering but before the aging at a predetermined point on the surface of the pane, or alternatively on a thin film covering the latter.

It has been shown that, using the heat soaking test, tempered glass panes do not contain critical nickel sulfide inclusions. It is known that such inclusions can lead to sudden spontaneous fracture, with unpredictable consequences, during the life of the tempered glass panes. During the heat soak test, in which the panes are heated to maximum temperatures of generally between 180 and 340° C., especially around 300° C., according to a predetermined time-temperature curve, panes break in a random fashion before they are mounted. The tempering of the panes has still not disappeared at these temperatures. In any case, this heat soaking test takes a great deal of time and necessarily incurs relatively high installation costs.

If the thermochromic color has been applied before the test, it undergoes a permanent change by an irreversible conversion of the color. Consequently, it is possible immediately to detect that the heat soaking test has been carried out on the completed, heat-tested/treated, tempered glass panes. Even very small residues of color may be clearly identified, by suitable methods, after the heat soaking test has been carried out.

For the application described here, thermochromic colors that contain the chemical compound iron (II, III) hexacyanoferrate as thermochromic pigment may be suitable. An example of such a commercially available pigment is "Mannox Blue 510". The color must exhibit good adhesion to the glass because of its composition.

Colored markings of this kind cannot be compared with inter alia an enamel. They cannot penetrate the surface of the glass or bond in a lasting manner thereto. On the contrary, it is possible in principle to remove them from the surface of the glass, completely and virtually without any trace, using a blade or steel wool after a heat soaking test. As a result, no reliable identification of the tested panes is possible or, put another way, it is not possible to exclude with certainty the fact that panes with no color mark have not undergone a heat soaking test. Thus, the indicative value of the color mark and the visible evidence of quality that stems therefrom are undesirably limited.

In addition, it should however not be possible to apply the marking color before the tempering, and produce the color change only by dint of the thermal tempering, without subsequently carrying out a heat soak test. The aforementioned color loses all adhesion to the surface of the glass after the action of high temperatures substantially above 300° C., such as those necessary for tempering the glass (well above 600° C.), so that they can no longer be used for the marking.

Also known, from document DE-C1-3 940 749, is a method for the durable marking or printing of glass panes, in which, in a layer deposited by screen printing, local color changes are induced via which the individual characteristics of the pane in question are indelibly displayed. This occurs in the known method by the fact that a marking composed of an organic material (color or ink) is applied locally, in a predetermined design, on the surface of the pane before printing with the inorganic screen-printing paste. During the high-temperature baking of the subsequently applied screen-printing paste, the organic compounds volatilize. Thus, local perturbations, or even holes, appear in the organic coating and these are clearly perceptible visually. Modification or removal of these designs is possible only by simultaneously removing the baked inorganic coating.

It is also known (DE-C2-4 111 625 and EP-B1-0 281 351) to produce fine structures, in the form of striations or similar features, in coatings deposited on a substrate by screen printing. In the aforementioned cases, these local heterogeneities serve to improve the brazability of the screen-printing paste that is necessarily electrically conducting after the baking operation, or alternatively to improve the adhesion of the spots of braze.

SUMMARY OF THE INVENTION

The object of the invention is to propose a method for the visual marking of substrates undergoing a heat treatment, which ensures that the marking color cannot be mechanically removed from the surface of the substrate, in such a way that the substrate is permanently marked. The aim of the invention is also to propose a substrate, in particular a glass pane, provided with a marking according to the invention.

As regards the method, this problem is solved in accordance with the invention by the characterizing features of claim 1. The characterizing features of claim 13 present a corresponding substrate. The characterizing features of the secondary claims, or alternatively those subordinate to the independent claims, present advantageous improvements of the subject matters.

To prevent the marking layer, or alternatively the marking color, from being able to be removed by mechanical means, a marking field is produced on one surface of the substrate before the tempering. The substrate is provided with a surface structure that is distinguished from the usual (smooth) surface and causes, in particular, intimate adhesive bonding between the colored field and the marking layer applied to it and, if appropriate, even allows depthwise penetration of the latter.

The marking field may be produced by a local modification of the smooth surface of the substrate itself, by locally modifying the smooth surface so as to achieve particularly good adhesion of the thermochromic marking color, for example by a chemical and/or mechanical action (acid etching, sandblasting, grinding). In this case, small areas of unevenness or small hollows have to appear in the surface of the substrate, these not having a negative impact on the overall printing of the substrate but forming a very good base for depositing the marking, with the result that the latter can be removed only at great cost and almost always still leaving traces thereof.

An alternative approach lies in the deposition of an additional surface structure in the form of a coating to be baked, in particular during the heat tempering. The marking field thus formed also forms a surface that is finely porous or also appropriately structured, to which a marking color, on the one hand, adheres well, and it is practically impossible, on the other hand, to remove the color without leaving traces.

If a coating to be baked forms the marking field, it is then produced with a surface structure promoting adhesion and penetration of the thermochromic color, in the form of a structured pattern or design, which interrupts the coating that covers the surface. The prior art on screen printing, already discussed, describes possibilities of providing such a coating with interruptions, if necessary over the full thickness and therefore right down to the surface of the substrate. However, it is also possible to produce disordered or irregular structures.

The improved marking according to the invention may be produced in a particularly discreet manner and for a relatively low additional cost if the marking field is provided as part of a stamp for marking the substrate. Tempered glass panes are usually provided with the manufacturer's stamp, allowing it to be traced back to the actual manufacturer, to the place of manufacture, to the date of manufacture, etc. This zone may be put to a new use with an area/surface portion marked with a color.

If the marking field is produced by modifying the surface of the substrate itself, it is also possible to produce in this case a predetermined and reproducible identification mark using an "etching" stamp. Depending on the thickness of the substrate in question, for example a glass pane, this marking field may even be placed on the edge, therefore at a point that is scarcely visible. It is also possible in principle—for a higher cost—to apply a printed marking field on one edge of the pane.

The result is that fine, limited areas of unevenness (scratches, pits) appear locally in the marking field on the surface of the substrate, which at the same time have a rough internal surface compared with the rest of the surface of the substrate. The marking color to be applied fills these areas of unevenness and bonds to their rough surface.

Of course, several marking fields may also be provided on the same substrate and the two aforementioned embodiments may also be combined with each other.

Because of the intimate bonding between the marking layer and the structured surface of the subjacent marking field, it is consequently no longer possible to completely remove the color with a glass plane, a blade or other tools. Even by rubbing strongly with glass wool, residues of color could still be identified using a microscope. Likewise, it is still possible to determine without any problem, by analysis, what color was employed.

Nevertheless, if an unauthorized attempt was made to remove the marking in addition to the baked coating or the applied surface structure, this would in all cases leave clear traces on the surface of the substrate, which would make one suspect that the substrate in question had been manipulated.

BRIEF DESCRIPTION OF THE DRAWINGS

Other details and advantages of the subject of the invention will be provided by the drawings of an illustrative example and by the following detailed description of the invention.

In the drawings.

DETAILED DESCRIPTION OF THE PREFERRED EMBODIMENTS

Figure 1:
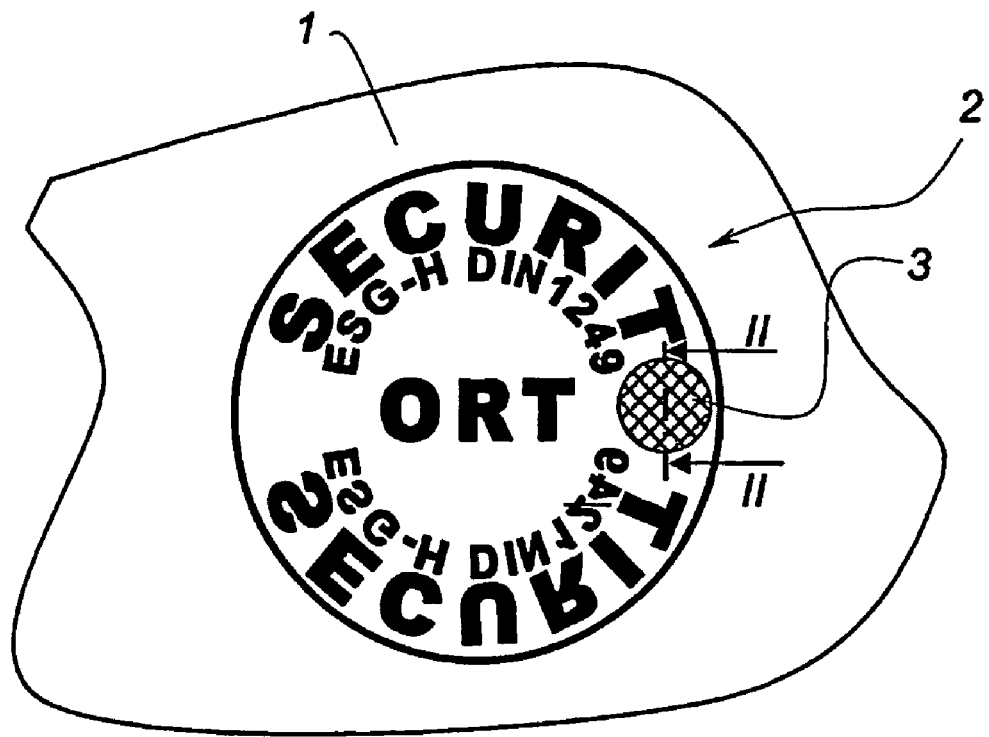
FIG. 1 shows one embodiment of a printed and baked manufacturer's stamp on a tempered glass pane, with a marking according to the invention.

In FIG. 1, a manufacturer's stamp 2 is printed and baked on a surface of a tempered glass pane 1 illustrated only by a fragment. It gives firstly the place of manufacture and possibly a trademark of the manufacturer. Furthermore, the stamp 2 indicates that it is a tempered monolithic glass. ESG stands for tempered safety glass, "H" means that a heat soak test was carried out and the stamp also indicates the corresponding DIN standard.

According to the invention, an additional marking field 3 has been added to the stamp, which area will be discussed in greater detail in relation to FIG. 2.

It should straight away be pointed out that this additional marking field 3 does not necessarily have to be joined to the stamp 2, unlike the illustration given by way of example, rather it may also be placed at any other point on the surface of the glass pane, and even on the edge. However, the arrangement shown here appears to be the most useful, because the stamp 2 must be visually inspected without difficulty during any removal and thus, at the same time, the marking 3 may also be identified.

Figure 2:
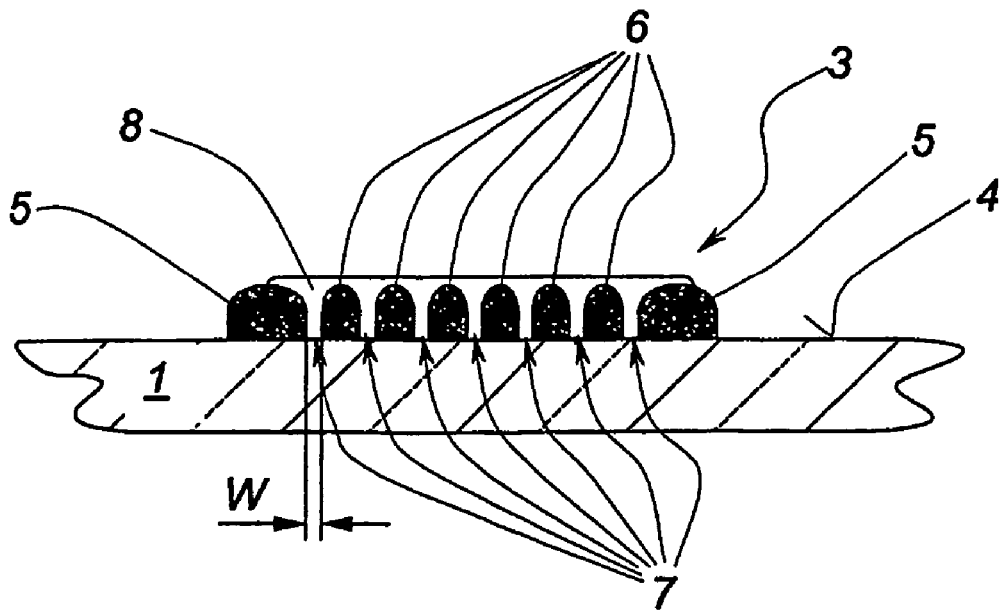
FIG. 2 shows an enlarged cross-sectional view, on no particular scale, taken along the line II-II of FIG. 1, through the marking zone.

As may be seen in the enlarged cross section of FIG. 2, the marking field 3 is essentially composed of a flat element 5, consisting of an appropriate paste to be baked, applied during the same operation as the stamp 2 to the surface 4 of the glass pane 1. The element 5 in this case is in the form of a grid pattern surrounded by a circular line, with ribs 6, as already illustrated in FIG. 1. The ribs 6 project by about 5 to 35 μm above the surface of the glass and each time define intermediate spaces 7, at the bottom of which the surface of the glass may be bare.

Deposited on the surface covered by the element 5 is a paint of a thermochromic color 8, which has penetrated the intermediate spaces 7 but which has also covered or which may cover the upper faces of the ribs 6 of the grid pattern. The intermediate spaces 7 must be large enough to allow the color 8 to penetrate, but small enough to ensure that simple tearing with mechanical tools is prevented. From the standpoint of the manufacturing technique, intermediate spaces with a width W of, for example, 0.5 to 0.7 mm do not cause problems. The height of the element 5 above the surface of the substrate is therefore shown here in a much too large size compared with the width of the intermediate spaces.

As regards the objective of the invention, it is not absolutely necessary for the color 8 to penetrate right to the surface of the glass. As already mentioned above, it is sufficient to prevent unauthorized complete removal, without residues and without traces, of the base of the element 5. Given that flat screen-printing elements have a certain porosity after baking, it would even be conceivable to provide the element 5 in the form of continuous spots or of a continuous base for depositing the thermochromic color, which could be permanently set in the pores of the said spots or base. However, it is preferable here to have a grid pattern, because it favors defined deposition of the thermochromic color 8 both in terms of shape and quantity. This contributes to the mechanization of the colored marking in an in-line industrial process before the heat soak test is carried out and thus it further lowers the costs thereof.

The invention claimed is:

1. A method for visual marking glass panes that are tempered and then heat-treated, the method comprising:
   producing a marking field that includes an uneven surface structure on a limited area of a smooth side surface of a glass pane, wherein the limited area is smaller than a total area of the side surface of the glass pane, and wherein the uneven surface structure is more rough than portions of the side surface of the glass pane that are outside of the limited area of the side surface of the glass pane;
   depositing a marking layer on the marking field such that the marking layer penetrates intermediate spaces or hollows within the marking field so as to create an intimate adhesive bond between the marking layer and the marking field; and
   modifying the marking layer deposited on the marking field via heat treatment, wherein the marking layer visually indicates that the heat treatment has been carried out, and wherein the color of the marking layer is irreversibly modified by the heat treatment.

2. The method as claimed in claim 1, wherein the marking field is produced on the surface of the glass pane before the glass pane is tempered.

3. The method as claimed in claim 1, wherein a color containing a thermochromic pigment is used as the marking layer, the color of which pigment is irreversibly modified at a temperature for the heat treatment.

4. The method as claimed in claim 1, wherein the heat-treatment is done via a hot storage test or a heat soaking test.

5. The method as claimed in claim 1, wherein the marking field configured for depositing the marking layer is produced by a chemical and/or mechanical action on the surface of the glass pane, during which hollows are formed in the surface into which the marking layer can penetrate.

6. The method as claimed in claim 1, wherein the marking field includes a coating that is deposited on the surface of the glass pane with defined open intermediate spaces into which the marking layer is introduced.

7. The method as claimed in claim 6, wherein the coating is deposited by screen printing and is then baked before the marking layer is deposited.

8. The method as claimed in claim 7, wherein the coating is baked during the heat tempering of the glass pane.

9. The method as claimed in claim 1, wherein the marking field comprises a portion of a marking stamp provided on the surface of the glass pane.

10. The method as claimed in claim 1, wherein a size and surface structure of the marking field and an amount and consistency of the marking layer to be deposited on the marking field are tailored to one another such that, in mass production, a same amount of material of the marking layer is always deposited in the marking field.

11. The method as claimed in claim 1, wherein the heat treatment has a maximum temperature of between 180 and 340° C.

12. A method for visual marking glass panes that are tempered and then submitted to a heat-soak test, with a marking layer that visually indicates that the heat-soak-test has been carried out, the method comprising:
   producing, before the heat-soak-test, a marking field on a local portion of a surface of a side of a glass pane by a local modification, wherein the marking field comprises an uneven surface structure, wherein the local portion of the surface of the side of the glass pane is a limited surface area on the side of the glass pane that is smaller than a total surface area of the side of the glass pane; and
   depositing, after the tempering, a marking color on said marking field so as to produce the marking layer, wherein the marking color fills said uneven surface structure so as to create an intimate adhesive bond between the marking layer and the marking field.

13. A method for visually marking glass panes, the method comprising:
   providing a glass pane that includes a first face and a second face;
   locally modifying a surface of said first face of said glass pane so as to produce a marking field that includes an uneven surface that is more rough than portions of the surface of said first face that are not within said marking field;
   depositing a marking layer of thermochromic marking color on said marking field such that the marking layer penetrates intermediate spaces or hollows within the marking field so as to create an intimate adhesive bond between the marking layer and the marking field; and
   submitting, after the depositing the marking layer on said marking field, the glass pane to a heat-soak test that irreversibly modifies the thermochromic marking color.

14. A method for visually marking glass panes as claimed in claim 13, wherein the glass pane is a tempered glass pane.

15. A method for visually marking glass panes as claimed in claim 13, wherein said locally modifying the surface of said first face of said glass pane so as to produce said marking field includes creating areas of unevenness or hollows in the surface of said first face.

16. A method for visually marking glass panes as claimed in claim 15, wherein said areas of unevenness or said hollows in the surface of said first face are created by sand blasting a local portion of the surface of said first face of said glass pane.

17. A method for visually marking glass panes as claimed in claim 15, wherein said areas of unevenness or said hollows in the surface of said first face are created by acid etching a local portion of the surface of said first face of said glass pane.

18. A method for visually marking glass panes as claimed in claim 13, wherein said locally modifying the surface of said first face of said glass pane includes depositing an additional surface structure that includes a plurality of intermediate spaces on a local portion of the surface of said first face of said glass pane.

19. A method for visually marking glass panes as claimed in claim 18, further comprising:
   heat tempering said glass pane, wherein said additional surface structure is deposited on the local portion of the surface of said first face of said glass pane before said heat tempering is performed, and wherein said depositing the layer of thermochromic marking color on said marking field is performed after said heat tempering is performed.

* * * * *